(12) United States Patent
Fukami

(10) Patent No.: US 11,623,530 B2
(45) Date of Patent: Apr. 11, 2023

(54) FUEL CELL VEHICLE

(71) Applicant: TOYOTA JIDOSHA KABUSHIKI KAISHA, Toyota (JP)

(72) Inventor: Tatsuya Fukami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 17/169,613

(22) Filed: Feb. 8, 2021

(65) Prior Publication Data

US 2021/0362607 A1 Nov. 25, 2021

(30) Foreign Application Priority Data

May 21, 2020 (JP) .............................. JP2020-089078

(51) Int. Cl.
*B60L 15/20* (2006.01)
*B60L 50/75* (2019.01)

(52) U.S. Cl.
CPC ............... *B60L 15/20* (2013.01); *B60L 50/75* (2019.02)

(58) Field of Classification Search
CPC ................................. B60L 15/20; B60L 50/75
USPC ....................................................... 180/65.31
See application file for complete search history.

(56) References Cited

U.S. PATENT DOCUMENTS

| | | | |
|---|---|---|---|
| 7,177,736 B2 * | 2/2007 | Uenodai | H01M 8/0491 429/444 |
| 7,315,771 B2 * | 1/2008 | Uenodai | H01M 8/04955 429/430 |
| 2007/0088468 A1 * | 4/2007 | Uenodai | B60L 58/33 701/22 |

FOREIGN PATENT DOCUMENTS

| | | |
|---|---|---|
| JP | 2008301542 A | 12/2008 |
| JP | 2008312418 A | 12/2008 |

* cited by examiner

*Primary Examiner* — James A Shriver, II
*Assistant Examiner* — Hilary L Johns
(74) *Attorney, Agent, or Firm* — Dickinson Wright, PLLC

(57) ABSTRACT

A fuel cell vehicle includes a battery and a fuel cell that supply an electric power to an electric motor for traveling. A controller sets a maximum increase rate of an output torque of the electric motor for a predetermined time after the fuel cell starts activation to be a first upper limit rate. The controller sets the maximum increase rate of an output torque after the lapse of the predetermined time to a second upper limit rate that is larger than the first upper limit rate.

4 Claims, 2 Drawing Sheets

FUEL CELL VEHICLE

CROSS-REFERENCE TO RELATED APPLICATION

This application claims priority to Japanese Patent Application No. 2020-089078 filed on May 21, 2020, incorporated herein by reference in its entirety.

BACKGROUND

1. Technical Field

The technique disclosed in the present specification relates to a fuel cell vehicle including a battery and a fuel cell that supply an electric power to an electric motor for traveling.

2. Description of Related Art

Japanese Unexamined Patent Application Publication No. 2008-301542 (JP 2008-301542 A) and Japanese Unexamined Patent Application Publication No. 2008-312418 (JP 2008-312418 A) disclose a fuel cell vehicle including a battery and a fuel cell. The fuel cell vehicle disclosed in the documents above can travel only using an electric power of the battery even before the fuel cell is activated.

SUMMARY

A maximum output of the battery is smaller than a maximum output of the fuel cell. An output torque of the electric motor is limited when the fuel cell vehicle is traveling only using the electric power of the battery. When the fuel cell is activated, the upper limit of the output torque of the electric motor increases. When the fuel cell is activated while the driver is depressing an accelerator pedal and the output torque of the electric motor suddenly increases, a driver may feel uncomfortable.

A controller disclosed in the present specification sets a maximum increase rate of an output torque of the electric motor for a predetermined time after the fuel cell starts activation to a first upper limit rate, and sets the maximum increase rate after a lapse of the predetermined time to a second upper limit rate that is larger than the first upper limit rate. A sudden increase in the output torque is suppressed by suppressing the maximum increase rate for the predetermined time after the fuel cell starts activation to be lower than the upper limit rate (the second upper limit rate) at a normal time, which can reduce a sense of discomfort given to the driver.

The first upper limit rate may be set as follows. Time during which the output torque of the electric motor reaches a second maximum output torque from a first maximum output torque at the first upper limit rate is longer than an activation time of the fuel cell. The first maximum output torque is the maximum output torque when the fuel cell vehicle is traveling using the battery only, and the second maximum output torque is the maximum output torque after the fuel cell is activated. When the activation time elapses, the electric motor can output the second maximum output torque. However, if the output torque of the electric motor is rapidly increased during the activation time, the driver feels uncomfortable to a greater extent. Therefore, setting the first upper limit rate as described above makes it possible to reduce a sense of discomfort given to the driver.

When the driver strongly depresses the accelerator pedal even during activation of the fuel cell, a sense of discomfort given to the driver is small although the increase rate is large. In other words, when a change in the accelerator operation amount is large, a sense of discomfort given to the driver is small although a change in the output torque is large. On the basis of the above, the controller may adopt the following control rule. When the accelerator operation amount immediately before activation of the fuel cell exceeds a predetermined first operation amount, the controller sets the maximum increase rate during the predetermined time to the first upper limit rate. When the accelerator operation amount immediately before activation of the fuel cell falls below the first operation amount, the controller sets the maximum increase rate during the predetermined time to a third upper limit rate. The third upper limit rate is larger than the first upper limit rate and equal to or less than the second upper limit rate.

Details of the technique disclosed in the present specification and further improvements will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
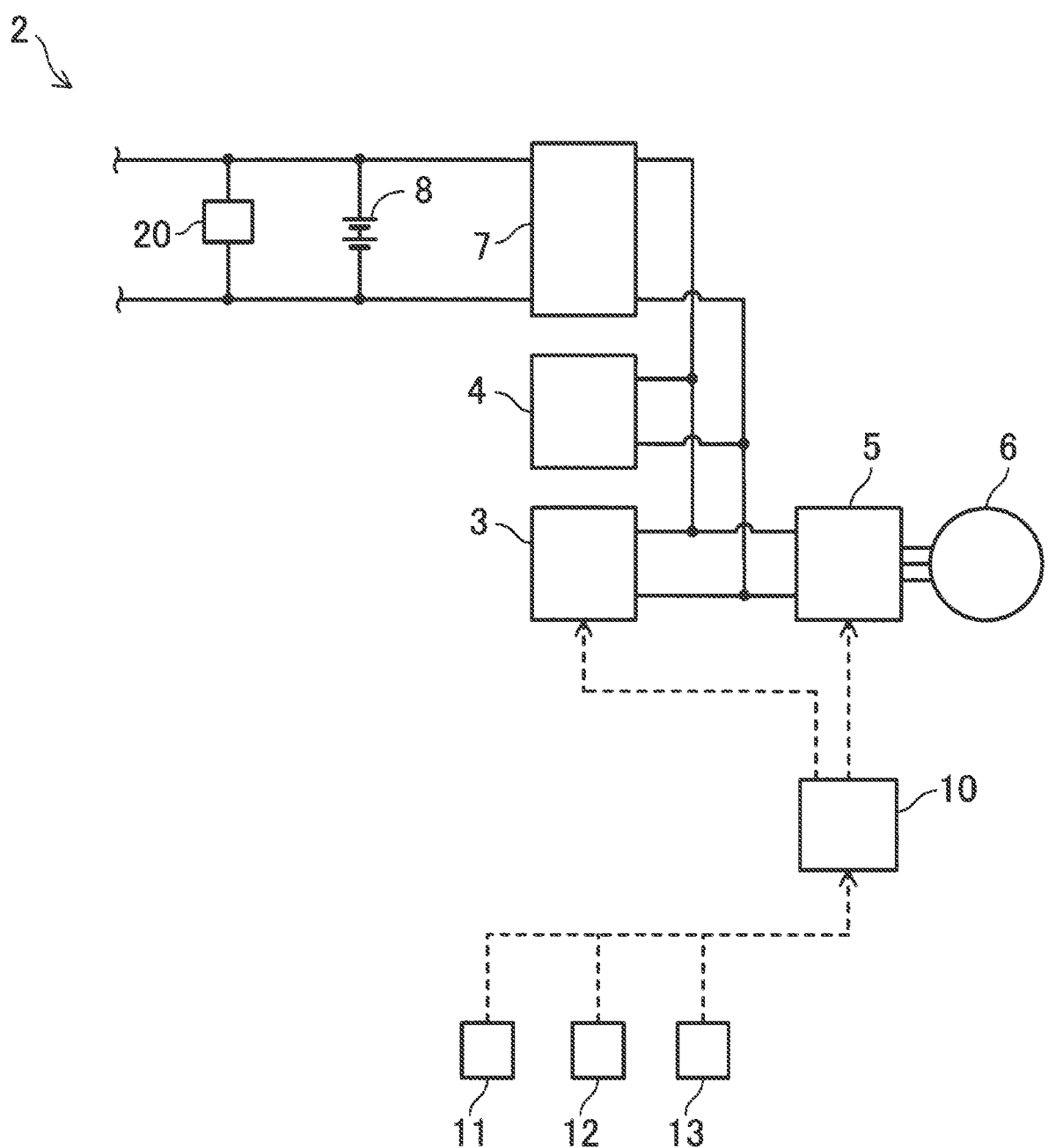
FIG. 1 is a block diagram of a fuel cell vehicle of an embodiment.

FIG. 1 shows a block diagram of a fuel cell vehicle 2 according to an embodiment. The fuel cell vehicle 2 travels using an electric motor 6 with an electric power supplied from a fuel cell 3 and a main battery 4. The fuel cell 3 and the main battery 4 are connected in parallel. Outputs from the fuel cell 3 and the main battery 4 are converted into alternate current (AC) power by a power converter 5 and supplied to the electric motor 6 for traveling. A boost converter may be connected between the fuel cell 3 and the power converter 5 (or between the fuel cell 3 and the main battery 4). A bidirectional voltage converter may be connected between the main battery 4 and the power converter 5. Dotted lines in FIG. 1 represent signal lines.

An input end of a step-down converter 7 is connected to the main battery 4, and a sub-battery 8 is connected to an output end of the step-down converter 7. An output voltage from the main battery 4 exceeds 100 volts, and an output voltage from the sub-battery 8 falls below 50 volts. The step-down converter 7 steps down the electric power output from the main battery 4 or the fuel cell 3 to charge the sub-battery 8.

The electric power of the sub-battery 8 is supplied to a device operating at a voltage of less than 50 volts. Devices powered by the electric power from the sub-battery 8 include low-power devices such as a radio 20 and various controllers (computers). Various accessories attached to the fuel cell 3 also receive supply of the electric power from the sub-battery 8.

The fuel cell 3 and the power converter 5 are controlled by a controller 10. Sensors such as a main switch 11, an accelerator pedal sensor 12, and a vehicle speed sensor 13 of the fuel cell vehicle 2 are connected to the controller 10. The accelerator pedal sensor 12 measures an operation amount of the accelerator pedal (accelerator operation amount). The controller 10 activates the fuel cell 3 when the main switch 11 is turned on. Further, the controller 10 determines the output torque of the electric motor 6 based on information such as the operation amount of the accelerator pedal or an operation amount of a brake pedal (not shown) and a vehicle speed. The controller 10 controls the fuel cell 3 and the power converter 5 in accordance with the determined output torque.

The fuel cell 3 requires a predetermined time to be activated. Although the fuel cell 3 requires time to be activated, the fuel cell vehicle 2 can start traveling using the electric power from the main battery 4 immediately after the main switch 11 is turned on. However, the maximum output of the main battery 4 is smaller than the maximum output of the fuel cell 3. Therefore, the maximum output torque of the electric motor 6 is small until the fuel cell 3 is activated. When the fuel cell 3 is activated, the maximum output torque of the electric motor 6 suddenly increases. When the fuel cell 3 is activated while the driver is depressing the accelerator pedal with a constant force and the output torque of the electric motor 6 suddenly increases, the driver may feel uncomfortable. The fuel cell vehicle 2 suppresses an increase rate of the output torque of the electric motor 6 while the fuel cell 3 is activated, which can suppress a sense of discomfort given to the driver.

The controller 10 determines the increase rate of the output torque in accordance with the accelerator operation amount. As the accelerator operation amount increases, the increase rate also increases. An upper limit value (maximum increase rate) of the increase rate is set in the controller 10. The controller 10 suppresses the increase rate of the output torque to be equal to or less than the maximum increase rate.

Figure 2A:
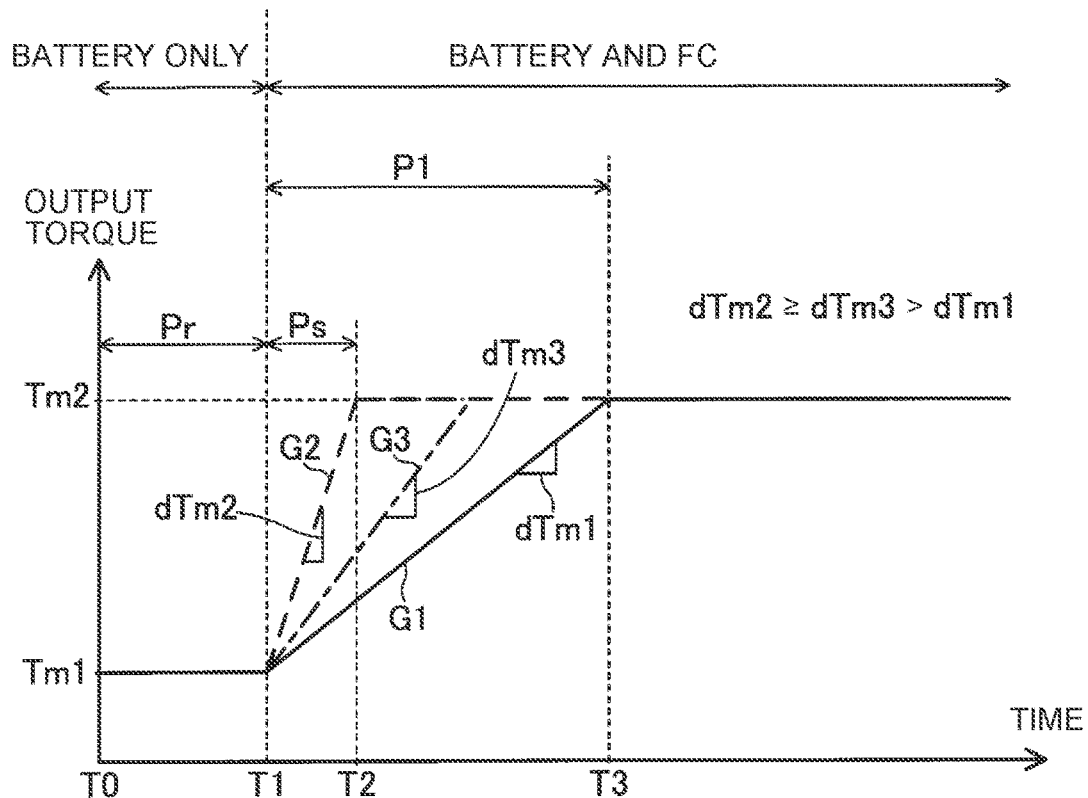
FIG. 2A is a graph showing the maximum output torque of an electric motor.
Figure 2B:
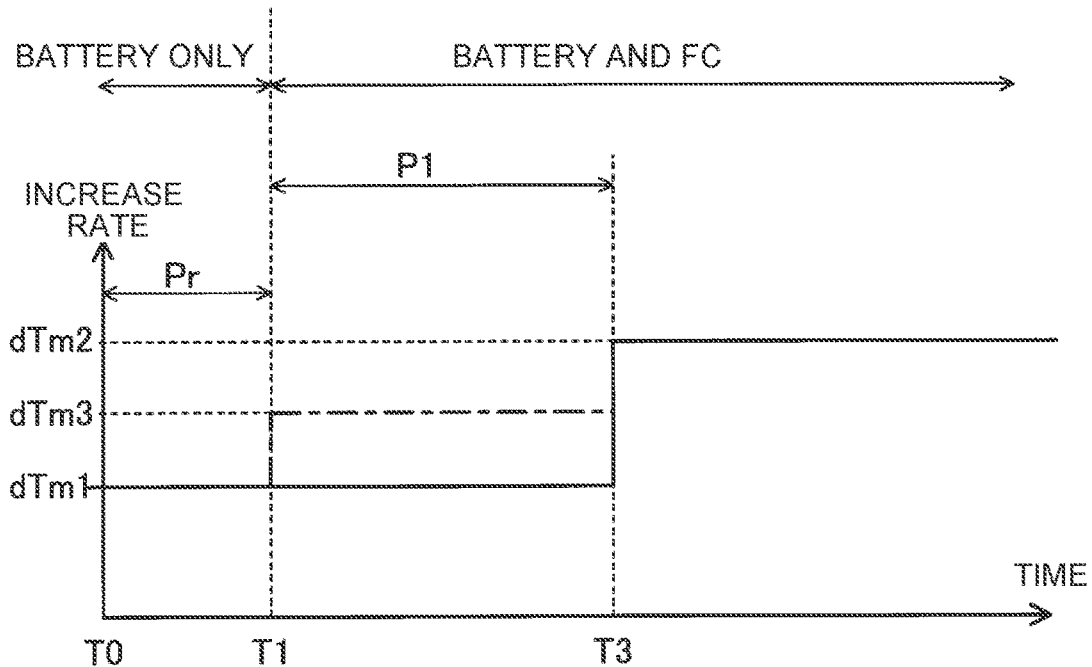
FIG. 2B is a graph showing the maximum increase rate of the output torque of the electric motor.

FIG. 2A is a graph showing the maximum output torque of the electric motor 6, and FIG. 2B is a graph showing the maximum increase rate of the output torque. The vertical axis of FIG. 2A represents the output torque of the electric motor 6, and the horizontal axis represents time. The vertical axis of FIG. 2B represents the increase rate, and the horizontal axis represents the time.

The main switch 11 is turned on at time T0. Preparation for activating the fuel cell 3 requires some time for a while after the main switch 11 is turned on. In FIGS. 2A and 2B, the time from time T0 to time T1 (activation preparation period Pr) is the time required for activation preparation. The fuel cell vehicle 2 can travel using the electric power from the main battery 4 until the fuel cell 3 starts activation. The maximum output torque of the electric motor 6 when the fuel cell vehicle 2 travels using the main battery 4 only is a first maximum output torque Tm1. The maximum output torque after the fuel cell 3 is activated is a second maximum output torque Tm2. In medium and high vehicle speed ranges, the maximum output torque of the electric motor 6 depends on the vehicle speed. The graphs of FIGS. 2A and 2B show changes in the maximum output torque in a low vehicle speed range in which the maximum output torque does not depend on the vehicle speed.

The activation of the fuel cell 3 starts at time T1. From time T1, supply of fuel gas and oxide gas to the fuel cell 3 starts, and the electric power starts to be output from the fuel cell 3. When the electric power starts to be output from the fuel cell 3, the maximum output torque of the electric motor 6 also increases. The activation of the fuel cell 3 is completed at time T2. The time from the time T1 to the time T2 is activation time Ps of the fuel cell 3.

The fuel cell vehicle 2 can start traveling immediately from time T0 using the electric power from the main battery 4. The maximum output torque (the first maximum output torque Tm1) from the electric motor 6 when the fuel cell vehicle 2 travels using the electric power from the main battery 4 only is smaller than the maximum output torque (the second maximum output torque Tm2) when the fuel cell vehicle 2 travels using the electric power from the fuel cell 3. From time T1 to time T2, the maximum output torque of the electric motor 6 increases from the first maximum output torque Tm1 to the second maximum output torque Tm2. However, the controller 10 limits the increase rate of the output torque of the electric motor 6 for a while after the fuel cell 3 starts the activation.

As shown in FIG. 2B, the controller 10 sets the maximum increase rate of the output torque of the electric motor 6 for the predetermined time P1 after the fuel cell 3 starts activation (time T1) to a first upper limit rate dTm1. The controller 10 also sets the maximum increase rate during traveling using the electric power from the main battery 4 only to the first upper limit rate dTm1. After a lapse of the predetermined time P1, the controller 10 changes the maximum increase rate from the first upper limit rate dTm1 to a second upper limit rate dTm2. The second upper limit rate dTm2 is larger than the first upper limit rate dTm1.

As described above, the fuel cell 3 starts activation at time T1 and completes the activation at time T2. When no upper limit is provided for the output torque, the output torque of the electric motor 6 can be increased at the second upper limit rate dTm2 at the maximum (see graph G2 in FIG. 2A). When the driver strongly depresses the accelerator pedal at the start of activation of the fuel cell 3 (time T1), the output torque of the electric motor 6 starts to increase sharply from time T1. If the output torque suddenly increases even though the operation amount of the accelerator pedal is constant, the driver feels uncomfortable. The controller 10 limits the increase rate of the output torque of the electric motor 6 to the first upper limit rate dTm1 or less for the predetermined time P1 after the fuel cell 3 starts activation. Therefore, the output torque of the electric motor 6 increases at the maximum along the graph G1 in FIG. 2A. The fuel cell vehicle 2 according to the embodiment can suppress a sense of discomfort given to the driver when the fuel cell 3 is activated.

In FIG. 2A, the increase rate limited as the fuel cell 3 is activated is represented by the second upper limit rate dTm2. The second upper limit rate dTm2 is the maximum increase rate after the fuel cell 3 is activated. Therefore, the second upper limit rate dTm2 is not necessarily consistent with the graph G2 in FIG. 2A. However, the second upper limit rate dTm2 is larger than the first upper limit rate dTm1.

The first upper limit rate dTm1 is set such that time during which the torque of the electric motor 6 reaches the second maximum torque Tm2 from the first maximum torque Tm1 at the first upper limit rate dTm1 (time P1 in FIG. 2A) is longer than the activation time Ps of the fuel cell 3. The fuel cell 3 has a capability to increase the maximum output torque from the first maximum output torque to the second maximum output torque during the activation time Ps. However, the maximum increase rate of the electric motor 6 is set to the first upper limit rate dTm1 (that is smaller than the second upper limit rate dTm2), thereby suppressing a sense of discomfort given to the driver.

The predetermined time P1 is set to the time required for the torque of the electric motor 6 to reach the second maximum torque Tm2 from the first maximum torque Tm1 at the first upper limit rate dTm1. When the accelerator operation amount is 100% at the start of activation of the fuel cell 3 (time T1), the maximum output torque of the electric motor 6 reaches the second maximum output torque Tm2 during the predetermined time P1. Even when the accelerator operation amount is 100%, the increase rate of the output torque is kept constant until the output torque reaches the second maximum output torque Tm2.

When the accelerator operation amount immediately before activation of the fuel cell 3 falls below a predetermined first operation amount, the controller 10 sets the maximum increase rate during the predetermined time P1 to a third upper limit rate dTm3. FIGS. 2A and 2B show a case where graph G3 indicated by the alternate long and short dash line is the third upper limit rate dTm3. As shown in FIGS. 2A and 2B, the third upper limit rate dTm3 is larger than the first upper limit rate dTm1 and is equal to or less than the second upper limit rate dTm2. The reason for increasing the upper limit rate when the accelerator operation amount immediately before activation of the fuel cell 3 falls below the predetermined first operation amount is described below.

When the driver strongly depresses the accelerator pedal even during activation of the fuel cell 3, a sense of discomfort given to the driver is small although the increase rate is large. In other words, when a change in the accelerator operation amount is large, a sense of discomfort given to the driver is small although a change in the output torque is large. Therefore, when the accelerator operation amount immediately before activation of the fuel cell 3 falls below the predetermined first operation amount, the controller 10 sets the maximum increase rate during the predetermined time to the third upper limit rate dTm3. When the change in the accelerator operation amount is large, acceleration of the vehicle can be improved. The first operation amount is set to, for example, 60%.

The electric motor 6 operates with the electric power supplied by the power converter 5. Therefore, suppressing the increase rate of the electric power supplied to the electric motor 6 can suppress the increase rate of the output torque of the electric motor 6. An increase rate dPm of the electric power supplied to the electric motor 6 can be determined based on Equation 1 below using the increase rate (for example, the first upper limit rate dTm1) of the output torque.

$$\begin{aligned} dPm &= Pm2 - Pm1 \\ &= (Nm2 \times Tm2 - Nm1 \times Tm1) \times \frac{2\pi}{60} \\ &= \{(Nm1 \times dNm \times dt) \times (Tm1 + dTm1) - \\ &\quad Nm1 \times Tm1)\} \times \frac{2\pi}{60} \end{aligned} \quad \text{Equation 1}$$

Meanings of the signs used in Equation 1 are as follows.
dt: Control cycle of the power converter 5
Pm1: Electric power supplied to the electric motor 6 in the current control cycle
Pmt: Electric power supplied to the electric motor 6 in the next control cycle
Nm1: Current rotation speed of the electric motor 6
Nm2: Scheduled rotation speed of the electric motor 6 in the next control cycle
dNm: Increase rate of the rotation speed of the electric motor 6
Tm1: Current output torque of the electric motor 6
Tm2: Scheduled output torque of the electric motor 6 in the next control cycle
dTm1: Increase rate of the output torque of the electric motor 6 (the first upper limit rate)

Setting the maximum increase rate of the output torque of the electric motor 6 to the first upper limit rate is equivalent to providing the increase rate of the electric power supplied to the electric motor 6 using Equation 1.

The points to be noted regarding the technique described in the embodiment will be described. The controller 10 limits the increase rate of the output torque of the electric motor 6 to the first upper limit rate (or the second upper limit rate or the third upper limit rate) or less. In other words, the controller 10 changes the increase rate in accordance with the accelerator operation amount, and sets the maximum increase rate to the first upper limit rate (or the second upper limit rate or the third upper limit rate). The increase rate when the accelerator operation amount is small may be smaller than the first upper limit (or the second upper limit rate or the third upper limit rate).

The controller 10 limits the increase rate of the output torque of the electric motor 6 for the predetermined time P1 after the fuel cell 3 starts activation to be the first upper limit rate dTm1 or less. In other words, the controller 10 sets the maximum increase rate of the output torque of the electric motor 6 for the predetermined time P1 after the fuel cell 3 starts activation to be the first upper limit rate dTm1. The controller 10 limits the increase rate after the elapse of the predetermined time P1 to the second upper limit rate dTm2 or less, which is larger than the first upper limit rate dTm1. In other words, the controller 10 sets the maximum increase rate after the elapse of the predetermined time P1 to the second upper limit rate dTm2 that is larger than the first upper limit rate dTm1.

In other words, further, control of the controller 10 is as follows. For the predetermined time P1 after the fuel cell 3 starts activation, the controller 10 sets the increase rate of the output torque of the electric motor 6 when the accelerator operation amount is 100% to be the first upper limit rate dTm1. At this time, when the accelerator operation amount is less than 100%, the increase rate of the output torque is equal to or less than the first upper limit rate dTm1. After the elapse of the predetermined time P1, the controller 10 limits the increase rate of the output torque when the accelerator operation amount is 100% to the second upper limit rate dTm2 that is larger than the first upper limit rate dTm1. At this time, when the accelerator operation amount is less than 100%, the increase rate of the output torque is less than the second upper limit rate dTm2.

Although specific examples of the disclosure have been described in detail above, the examples are merely examples and do not limit the scope of claims. The technique described in the claims includes various modifications and variations of the specific examples exemplified above. The technical elements described in the present specification or in the drawings exhibit technical usefulness alone or in various combinations, and are not limited to the combinations described in the claims at the time of filing the application. In addition, the technique exemplified in the present specification or drawings can achieve a plurality of purposes at the same time, and achieving one of the purposes itself has technical usefulness.

What is claimed is:

1. A fuel cell vehicle, comprising a battery and a fuel cell that supply an electric power to an electric motor for traveling, wherein
   a controller that controls the electric motor
   sets a maximum increase rate of an output torque of the electric motor for a predetermined time after the fuel cell starts activation to a first upper limit rate, and
   sets the maximum increase rate after a lapse of the predetermined time to a second upper limit rate that is larger than the first upper limit rate.

2. The fuel cell vehicle according to claim 1, wherein the first upper limit rate is set such that time during which the output torque of the electric motor reaches a maximum output torque after the activation of the fuel cell from a maximum output torque when the fuel cell vehicle travels using the battery only at the first upper limit rate is longer than an activation time of the fuel cell.

3. The fuel cell vehicle according to claim 1, wherein the predetermined time is set to time during which the output torque of the electric motor reaches a maximum output torque after the activation of the fuel cell from a maximum output torque when the fuel cell vehicle travels using the battery only at the first upper limit rate.

4. The fuel cell vehicle according to claim 1, wherein the controller
   sets the maximum increase rate for the predetermined time is set to the first upper limit rate when an accelerator operation amount immediately before the activation of the fuel cell exceeds a predetermined first accelerator operation amount, and
   sets the maximum increase rate for the predetermined time to a third upper limit rate when the accelerator operation amount immediately before the activation of the fuel cell falls below the first accelerator operation amount, the third upper limit rate being larger than the first upper limit rate and smaller than the second upper limit rate.

* * * * *